READY ACCESS TRANSPARENCY FILING SYSTEM

Original Filed July 25, 1961 3 Sheets-Sheet 1

INVENTOR.
ERIC W. LEAVER
BY [signature]
ATTORNEY

READY ACCESS TRANSPARENCY FILING SYSTEM

Original Filed July 25, 1961

INVENTOR.
ERIC W. LEAVER
BY
[signature]
ATTORNEY

READY ACCESS TRANSPARENCY FILING SYSTEM

Original Filed July 25, 1961 3 Sheets-Sheet 3

INVENTOR.
ERIC W. LEAVER
BY Henry L. Shenier
ATTORNEY

United States Patent Office 3,299,554
Patented Jan. 24, 1967

1 2

3,299,554
READY ACCESS TRANSPARENCY FILING SYSTEM

Eric W. Leaver, Toronto, Ontario, Canada, assignor to Electronic Associates Limited, Willowdale, Ontario, Canada, a private company of Canada Continuation of abandoned application Ser. No. 126,581, July 25, 1961. This application Nov. 2, 1964, Ser. No. 409,050
11 Claims. (Cl. 40—79)

This application is a continuation of application Serial Number 126,581, filed July 25, 1961, and now abandoned.

My invention relates to an information storage system and more particularly to a ready access information storage system which is more convenient and expeditious to use than are information storage systems of the prior art.

Many and various systems are known in the prior art for storing or filing information. Various systems both manual and automatic are known for providing access selectively to the stored information. More particularly, for purposes of economy in the use of storage space the practice of recording information on microfilm or the like has become prevalent. An accumulation of information stored in this manner is in the form of a number of reels of film each of which reels contains a large number of frames carrying pages of information. When access to the information on a certain page is desired and after the corresponding reel and frame have been identified, the reel must be unwound until the particular frame desired is in a position at which an image of the frame can be projected on a suitable viewing screen. It will be appreciated that this is a tedious and time consuming operation.

I have invented a rapid access information storage system which overcomes the defects of storage systems of the prior art pointed out hereinabove. My system provides rapid access to any one of a large number of blocks of information. My system is especially adapted for use in connection with information stored in the form of transparencies. My system is extremely simple in that it involves no complicated electrical equipment. It is rugged and not readily deranged.

One object of my invention is to provide a rapid access information storage system which overcomes the defects of information storage systems of the prior art.

Another object of my invention is to permit a rapid access information storage system which is simple in that it involves no complicated electrical equipment.

Still another object of my invention is to provide a rapid access information storage system which is rugged and which is not readily deranged.

Other and further objects of my invention will appear from the following description.

In general, my invention contemplates the provision of a rotatable drum or magazine which houses a large number of radially extending transparency holders each of which carries a plurality of transparencies spaced along its length. In response to the operation of a keyboard a particular transparency corresponding to the actuated keys is automatically positioned at a point at which its image is projected on a suitable viewing screen.

In the accompanying drawings which form part of the instant specification and which are to be read in conjunction therewith and in which like reference numerals are used to indicate like parts in the various views.

Figures 1, 3:
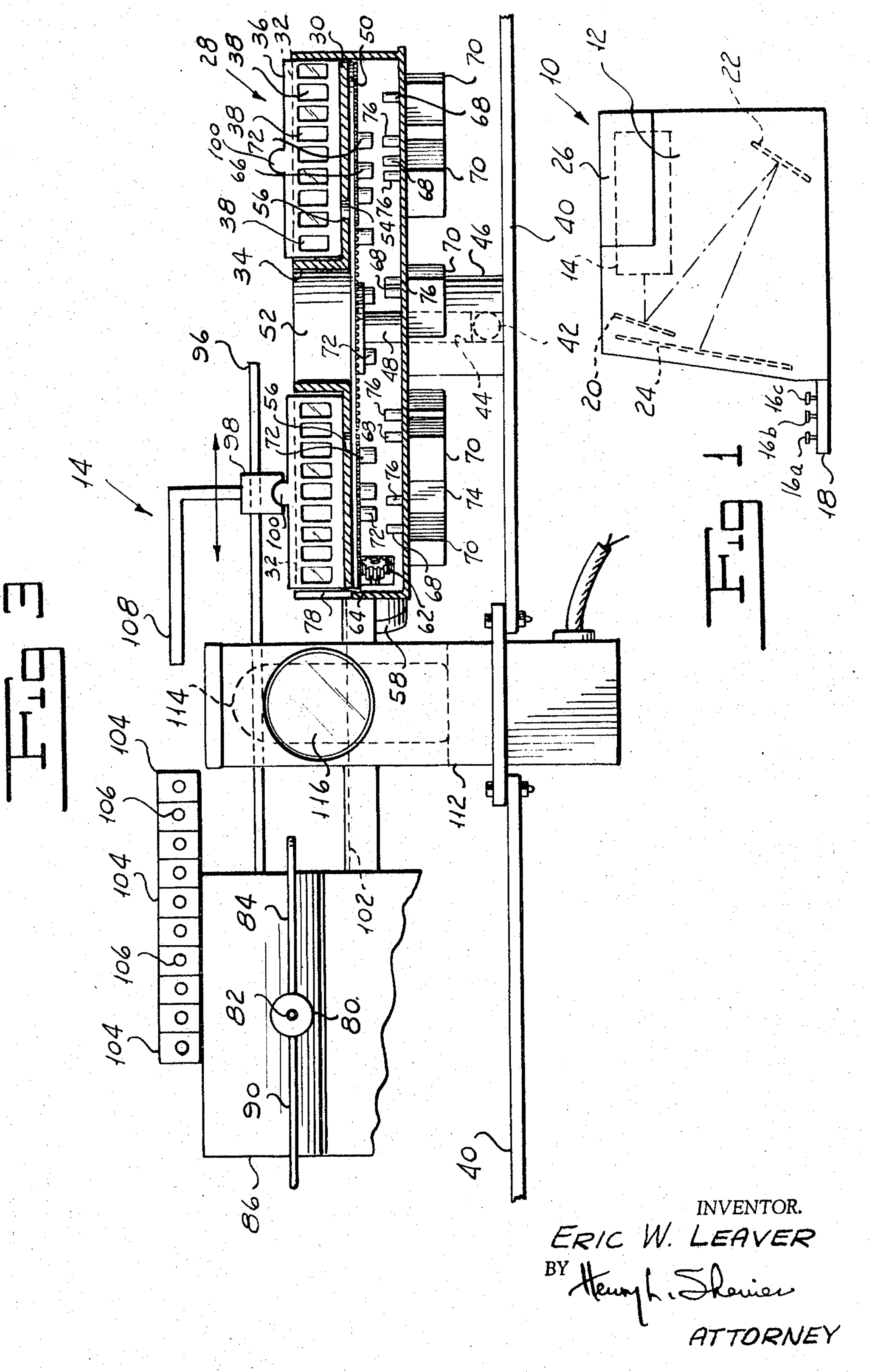
FIGURE 1 is an elevated view of my rapid access information storage system with components shown schematically.
FIGURE 3 is a side elevation of the form of my rapid access information storage system shown in FIGURE 2.

Referring now to FIGURE 1, my rapid access information storage system indicated generally by the reference character 10 includes a housing 12 in the interior of which I dispose a transparency storage-and-projection component 14 to be described in detail hereinafter. In response to the operation of keys 16 carried by a board 18 the image of a selected transparency is projected out of the mechanism 14 to a mirror 20 which reflects the image to a second mirror 22 which in turn reflects the image to a viewing screen 24 in the front of the housing 12 at a position at which it can be seen by the operator. Conveniently I provide the housing 12 with a cover 26 permitting access to the interior of the housing when desired.

Figure 2:
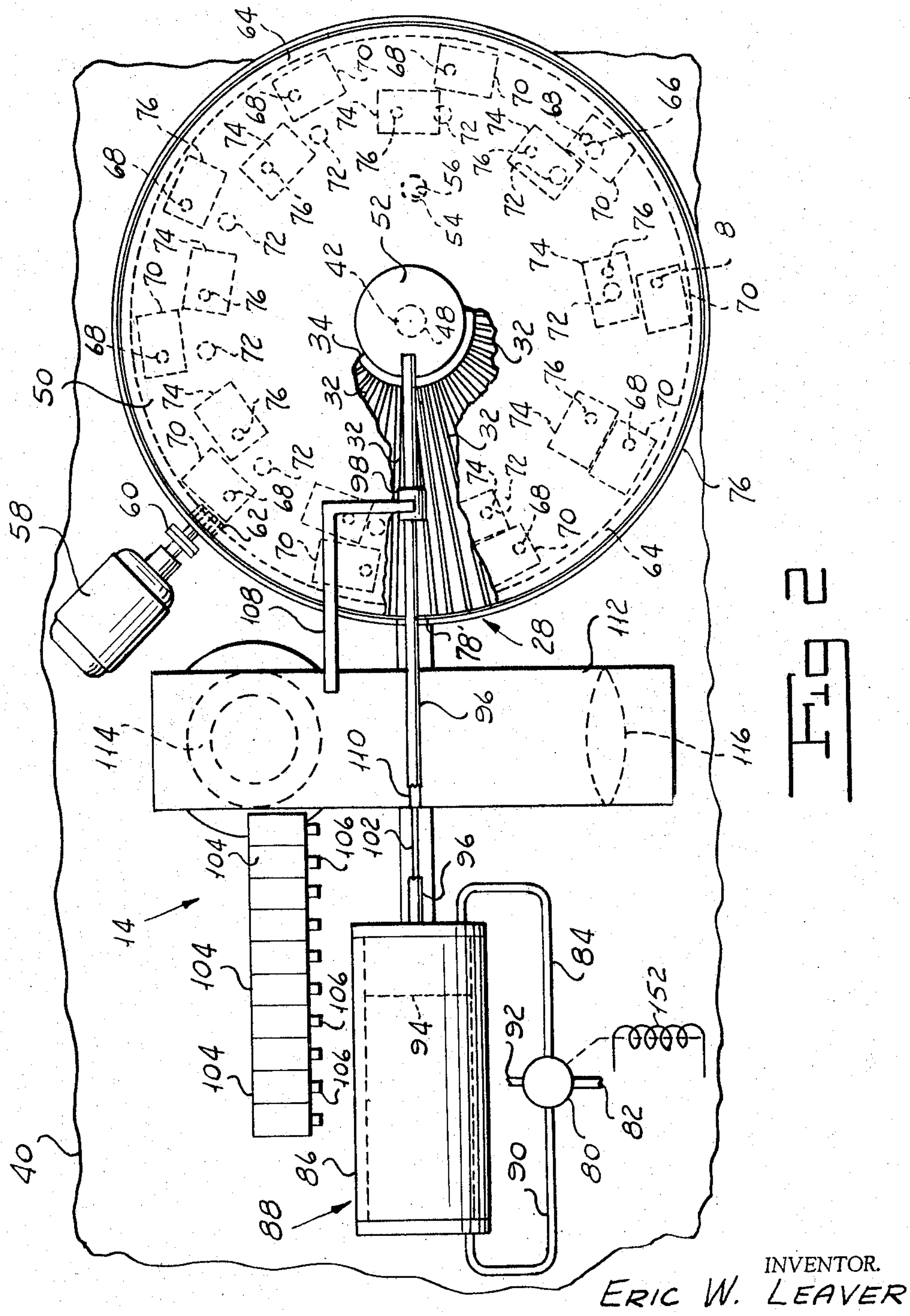
FIGURE 2 is a top plan view of my information storage system which parts are shown schematically.

Referring now to FIGURES 2 and 3 of the drawings, my information storage system includes a magazine indicated generally by the reference character 28 made up of a disc 30 provided with a plurality of dividers or partitions 32 extending radially outwardly from a hub 34. The magazine 28 is adapted to receive a plurality of slides or carriers 36 each of which is disposed in the space between a pair of adjacent partitions 32. In the particular form of my invention illustrated in the drawings each slide 36 supports a plurality of transparencies 38 spaced along the length of the carrier. In the form of the invention shown the transparencies 38 may record respective pages of stored information.

My device includes a supporting framework 40 secured to the interior of the housing 12 in any suitable manner. I dispose a ball bearing 42 within the bore 44 of a cylindrical support 46 adapted to receive a turntable shaft 48. Shaft 48 carries a turntable 50 provided with a boss 52 adapted to receive the hub 34 of the magazine 28. Locating projections 54 on the turntable 50 register with recesses 56 in the underside of disc 30 correctly to locate the magazine 28 on the turntable 50 for a reason which will be described hereinafter.

My device includes a motor 58 the shaft of which drives a gear 62 through a slip clutch 60. Gear 62 engages the teeth of a ring gear 64 supported on the underside of turntable 50. When the motor 58 is energized it normally rotates the turntable 50 about the axis of shaft 48. It will be appreciated that the magazine 28 is carried by turntable 50 for rotation therewith. Clutch 60 permits the table 50 to be stopped in a manner described hereinafter without damage to the drive system.

I provide my information storage device with means for stopping the turntable in a position at which any one of the slides or carriers 36 is at a predetermined location at which it may be moved into the projector to be described hereinafter. In the form of my invention shown in the drawings, the magazine 28 is adapted to carry one hundred radially extending slides 36 so that I must stop the table selectively in any one of one hundred positions. A stop pin 66 carried by the underside of the turntable 50 at a predetermined radius is adapted to be energized by the armature 68 of one of a plurality of solenoids 70 spaced around the plate 71 at intervals of 36°. In response to the operation of keys to be described in detail hereinafter, I selectively energize one of the solenoids 70 to raise its associated armature 68 to a position at which it is in the path of movement of the pin 66 thereby selectively to stop the magazine in any one of 10 different positions.

I dispose a plurality of second stop pins 72 around the circumference of a circle having a smaller radius than that of the circle around which armatures 68 are disposed and secure these pins 72 to the underside of the turntable 50 by any suitable means. I provide the form of my invention shown in the drawings with ten pins 72 spaced by intervals of 36°. Associated with the circle of pins 72 are nine solenoids 74 each of which has an armature 76. The axes of the respective armatures 76 are spaced by 39.6° of arc beginning at a point 3.6° from the 0° position which is used as a datum line. In a manner to be described hereinafter, once the turntable has been stopped at one of the ten positions determined by the energization of a solenoid 70, one of a second group of keys is actuated to energize a solenoid 74 and to de-energize that solenoid 70 which was energized by actuation of one of the first group of keys. When this occurs, magazine 50 is permitted to move a short distance further from the position in which it was stopped upon actuation of the first key. In other words, the solenoids 74 divide the segments defined by adjacent solenoids 70 into nine positions, zero position being determined by the solenoids 70.

Plate 71 carries an annular retainer 77 provided with an opening 78 at a predetermined location around its periphery. In response to the energization of a solenoid 70 and a solenoid 74 in the manner described above, one of the slides 36 is positioned adjacent opening 78.

I provide my storage device with means responsive to the actuation of one of a third group of keys for withdrawing the slide 36 positioned adjacent opening 78 a predetermined distance radially outwardly of the magazine. A valve 80 is supplied with air under pressure from a suitable source (not shown) by a hose or a pipe 82. In one position of the valve 80 pipe 82 is connected to a line 84 leading to one end of the cylinder 86 of a piston and cylinder arrangement indicated generally by the reference character 88. In this position of the valve 80 the other end of the cylinder 86 is connected by a pipe 90 and by the valve 80 to an exhaust line 92.

Cylinder 86 houses a piston 94 provided with a rod 96. Rod 96 carries a member 98 adapted to engage a tab 100 on the slide 36 posiitoned adjacent the opening 78. When pipe 84 is connected to the source of air under pressure, piston 94 moves to the left as viewed in FIGURE 2 to withdraw a slide 36 from the magazine through the opening 78. A guide track 102 guides the slide 36 in its movement out of the magazine 28. When the position of valve 80 is reversed in a manner to be described hereinafter so that air under pressure is supplied to line 90 piston 94 moves to the right to return the slide to the magazine.

A plurality of respective solenoids 104 having armatures 106 are adapted to be selectively energized in a manner to be described to position their armatures in the path of movement of a stop 108 carried by rod 96 for movement therewith. By selectively energizing one of the solenoids 104 I determine the extent of the radial outward movement of the slide 36 disposed adjacent the opening 78.

As a slide 36 is drawn out of the magazine 28 by the action of rod 96 it moves through a slot 110 in a housing 112 to a position, as determined by the energized solenoid 104, at which one of the transparencies 38 is in position within housing 112. A lamp 114 disposed within housing 112 directs light through the transparency 38 positioned within housing 112 and causes a lens 116 in the housing 112 to transmit an image to the mirror 20.

Figure 4:
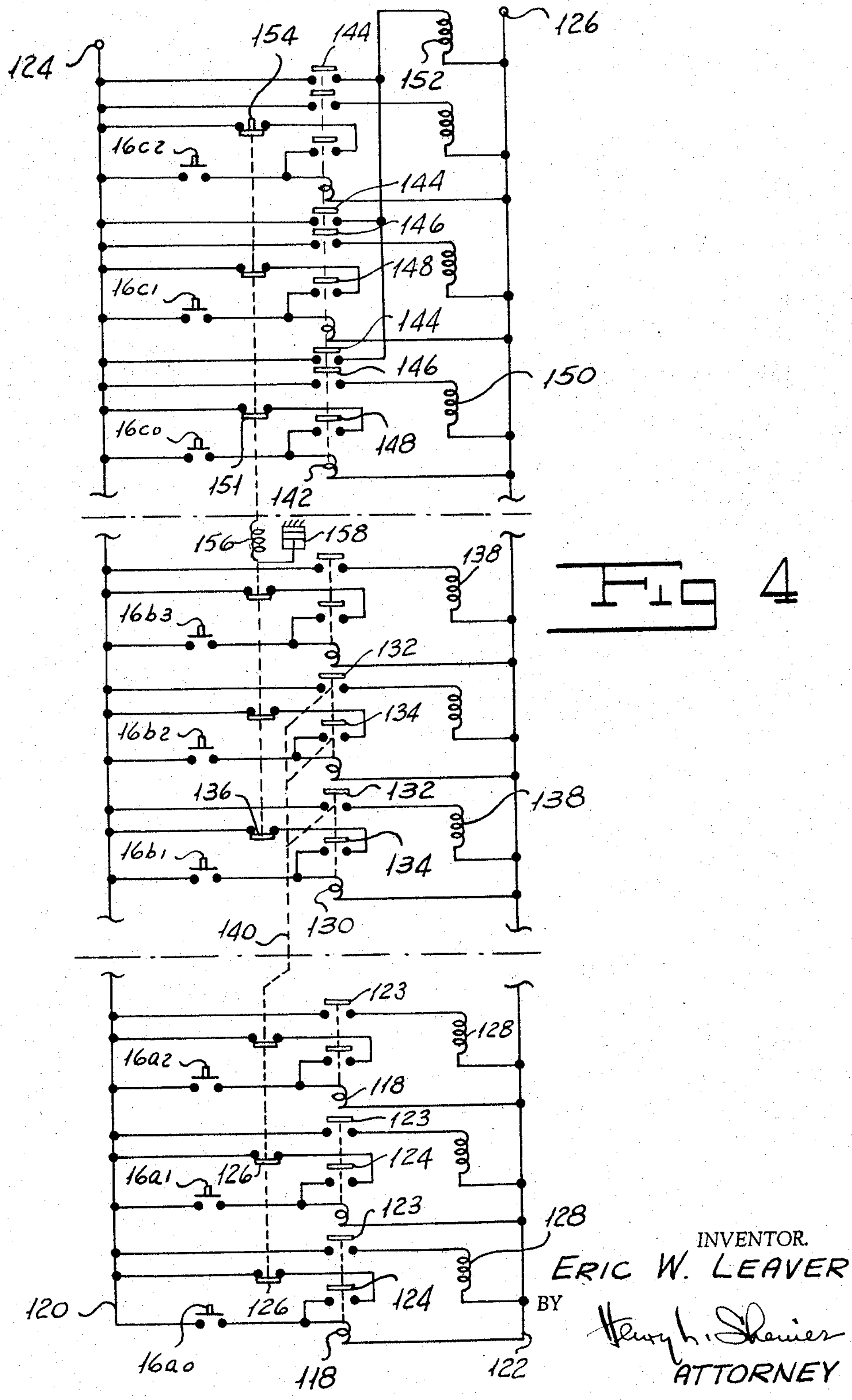
FIGURE 4 is a schematic view of one form of electrical circuit which may be employed in my rapid access information storage system.

Referring now to FIGURE 4 of the drawings, I have shown a portion of one form of electrical circuit which can be employed to control the operation of my device. In the figure, I have indicated the keys 16 associated with the solenoids 70 by the respective reference characters $16_{a0}$, $16_{a1}$, $16_{a2}$. To avoid confusion, I have shown only three of the keys associated with solenoids 70 although in the particular form of my invention shown in the drawings, there are ten solenoids 70. I connect each of the normally open switches $16_a$ in series with a relay winding 118 between respective conductors 120 and 122 connected to the terminals 124 and 126 of a suitable source of control potential. When a key $16_a$ is pressed to close its associated switch, the corresponding winding 118 is energized to close a pair of normally open switches 123 and 124. I connect each switch 124 in series with a respective normally closed switch 126 between conductor 120 and the terminal of winding 118 to which the switch $16_a$ is connected to provide a holding circuit for the winding 118 after release of the key $16_a$. Each switch 123 is connected in series with the corresponding winding 128 of the solenoid 70 between conductors 120 and 122. Thus when a key $16_a$ is pressed, winding 118 is energized to close switch 124 to make its own holding circuit and to close switch 123 to energize the associated solenoid winding 128. In response to this operation magazine 50 is stopped in one of the ten positions determined by the solenoids 70.

In FIGURE 4, I have represented keys 16 associated with solenoids 74 by the reference characters $16_{b1}$, $16_{b2}$, $16_{b3}$. For purposes of simplicity, I have shown only three of these keys although as is pointed out above there are nine solenoids 74. A dummy key $16_{b0}$ may be provided if desired. I connect each of the $16_b$ solenoids in series with a respective relay winding 130 between conductors 120 and 122. In response to operation of a $16_b$ key, the corresponding winding 130 is energized to close respective normally open switches 132 and 134. I connect switch 134 in series with a normally closed switch 136 between conductor 120 and the terminal of winding 130 to which the switch $16_b$ is connected to provide a holding circuit for the winding 130. I connect switch 132 in series with the winding 138 of the corresponding solenoid 74 between conductors 120 and 122. In response to operation of a $16_b$ key, winding 130 is energized to complete its own holding circuit and to energize the corresponding winding 138 through the switch 132. It is to be noted that I arrange my circuit so that upon closure of any switch 132 all the switches 126 are interrupted by operation of a linkage 140 thus to de-energize the energized winding 128 to permit further movement of the magazine 50, which further movement is determined by the particular winding 138 which is energized.

In FIGURE 4, I have indicated the keys 16 associated with solenoids 104 as respective normally open push button switches $16_{c0}$, $16_{c1}$, and $16_{c2}$. For purposes of clarity I have illustrated only three of these keys although in fact there are ten. I connect each of the switches $16_c$ in series with the respective relay winding 142 between conductors 120 and 122. When a $16_c$ switch is actuated, the corresponding winding 142 is energized to close respective normally open switches 144, 146 and 148. Each switch 148 is connected in series with a normally closed switch 151 between conductor 120 and the terminal of winding 142 to which the switch $16_c$ is connected to provide a holding circuit for the winding 142. Each switch 146 is connected in series with the winding 150 of the solenoid 104 with which it is associated between conductors 120 and 122. I connect each of the switches 144 in series with the air cylinder operating solenoid 152 between conductors 120 and 122. In response to operation of a button $16_c$ winding 142 is energized to complete its own holding circuit through switches 148 and 150 to energize one of the switches 150 through the solenoids 104 and to complete the circuit of the solenoid 152. A reset key or push button 154 is adapted to be actuated to open all the switches 136 and 151 to reset the mechanism.

In operation of my ready access transparency filing system let us assume that the motor 58 is energized so that the turntable 50 is continuously rotating about the axis of shaft 48. Assume further that it is desired to position one of the nine hundred and ninty-nine transparencies 38 within the projector housing 112 in a position at which an image of the transparency can be directed onto the viewing screen 24. By way of a particular example, assume that transparency 231 is to be so positioned. To cause this operation to take place, the operator first presses the key $16_{a2}$ to cause the corresponding winding 113 to be energized to close switches 122 and 124 to complete a holding circuit for the winding through switches 124 and 126 and to energize the proper solenoid winding 128. When this occurs, the solenoid 70 corresponding to the 200 position is energized to raise its armature 68 to a position in the path of stop 66. The turntable continues to rotate until the stop 66 engages the armature 68. Next the operator actuates the key $16_{b3}$ to energize the associated winding 130 to close its switches 132 and 134 to complete a holding circuit for the winding through switches 134 and 136 and to energize the proper winding 138. When switch 132 closes, it operates linkage 140 to open the holding circuit 138 which was energized upon operation of a $16_a$ key. The action just described causes one of the armatures 76 to be raised to a position at which it is in the path of a stop 72 which permits further movement of the turntable 50 to the 230 device. When the turntable thus stops in the 230 position, the key $16_{c1}$ is operated to energize its associated winding 142 to close switches 144, 146 and 148 to complete a holding circuit for the winding through switches 148 and 151 to energize a solenoid winding 150 and to energize the valve operating winding 152.

Energization of winding 150 moves one of the armatures 106 to a position at which it is in the path of stop 108. Energization of control winding 152 moves valve 80 to a position at which piston 94 is driven to the left as viewed in FIGURE 2 until stop 108 engages an armature 106 so that slide 231 is in position within housing 112 to permits its image to be imposed on the viewing screen 124. After the image has been viewed, reset key 54 is actuated to open the switches 136 and 151 to permit valve 80 to return the slide to the magazine and to permit the armatures to return to their inoperative positions so that the turntable is free to rotate. I provide any suitable means for delaying the opening of switch 136 until slightly after switches 151 are opened to ensure that the slide is returned to the magazine before continued rotation of the turntable is permitted.

It will be seen that I have accomplished the objects of my invention. I have provided an information storage system which overcomes the defects of systems of the prior art. My system permits ready access to any one of a large number of blocks of information. My system is simple in construction and operation in that it employs no complicated electrical mechanism. My device is rugged and not easily deranged.

It will be understood that certain features and subcombinations are of utility and may be employed without reference to the other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A ready access information storage system for selectively positioning at an access location one of a plurality of items of recorded information stored on carriers each of which has a number of items thereon including in combination a turntable, a readily removable magazine for supporting a plurality of carriers, means mounting said magazine on said turntable, means for selectively moving said turntable to a position at which a carrier having a desired item thereon is adjacent said access location and means for selectively moving the carrier having the desired item thereon to one of a plurality of positions at which the desired item is in said access location.

2. A ready access information storage system for selectively positioning at an access location one of a plurality of items of recorded information stored on carriers each of which has a number of items thereon including in combination a magazine for supporting a plurality of carriers, a support, means mounting said magazine for movement on said support, means for driving said magazine to move said carriers past said location, a first stop on said magazine mounting means, a plurality of first movable members, means mounting said first movable members on said support at spaced locations for movement from positions out of the path of said stop to positions in the path of said stop and means for selectively moving one of said first members to a position in the path of said stop to stop said magazine in one of a number of spaced positions, a plurality of second stops disposed at spaced locations on said magazine mounting means, a plurality of second movable members disposed at spaced locations on said support for movement from positions at which they are out of the path of said second stops to positions at which they are in the path of said second stops and means for selectively moving one of said second members into the path of a second stop while moving an actuated first member out of the path of said first stop whereby to permit said magazine to move to a position intermediate a pair of adjacent positions determined by said first movable member whereby to position a carrier adjacent said access location.

3. A ready access information storage system for selectively positioning at an access location one of a plurality of items of recorded information stored on carriers each of which has a number of items thereon including in combination a magazine for supporting a plurality of carriers, a support, means mounting said magazine for movement on said support, means for driving said magazine to move said carriers past said location, a first stop on said magazine mounting means, a plurality of first movable members, means mounting said first movable members on said support at spaced locations for movement from positions out of the path of said stop to positions in the path of said stop and means for selectively moving one of said first members to a position in the path of said stop to stop said magazine in one of a number of spaced positions, a plurality of second stops disposed at spaced locations on said magazine mounting means, a plurality of second movable members disposed at spaced locations on said support for movement from positions at which they are out of the path of said second stops to positions at which they are in the path of said second stops, means for selectively moving one of said second members into the path of a second stop while moving an actuated first member out of the path of said first stop whereby to permit said magazine to move to a position intermediate a pair of adjacent positions determined by said first movable members whereby to position a carrier adjacent said access location and means for moving the carrier positioned adjacent said access location to a position at which a selected item on the last named carrier is at said access location.

4. A ready access information storage system for selectively positioning at a reading station at an access location items of information stored on carriers each having a number of items thereon including in combination a magazine for supporting a plurality of said carriers, means mounting said magazine for rotary movement, means for selectively moving said magazine to a position at which a carrier having a desired item of information thereon is adjacent said access location, means for moving a carrier at said access location in a radial direction, a plurality of radially spaced stops adjacent said access location, said stops being adapted to be rendered selectively operable to arrest a carrier being moved in a radial direction by said moving means to position the selected item of information at said reading station.

5. A ready access information storage system for selectively positioning an information carrier at an access location including in combination a magazine for supporting a plurality of said carriers, means mounting said magazine for rotary movement to move said carriers past said access location, means for driving said magazine, a plurality of selectively-operable generally circularly-disposed regularly-spaced first stop elements on one of said magazines and said mounting means, a second stop on the other of said magazines and mounting means adapted to be engaged by one of said selectively operable stops, a plurality of third stops on said magazine, a plurality of fourth stop elements disposed on mounting means, the stops of said plurality of third stops and said plurality of fourth stops being disposed generally on the locus of a circle with the stops of one plurality regularly spaced and with the stops of the other plurality having a progressively increasing interstop spacing, the stops of one of the plurality of third stops and of the plurality of fourth stops being selectively operable, means for operating one of said first stops to arrest said magazine and means for concomitantly deactivating an operated first stop and for activating one of said third and fourth stops to permit a limited further movement of said magazine to position a selected carrier at said access location.

6. A ready access information storage system for selectively positioning at an access location one of a plurality of information carriers including in combination, a support, a magazine for holding said carriers, means mounting said magazine on said support for rotary movement of said carriers past said location, first interengageable stop means on said mounting means and on said support for selectively stopping said magazine in one of a plurality of first angularly spaced positions, and second interengageable stop means on said mounting means and on said support for selectively stopping said magazine at a plurality of second angularly spaced positions intermediate said first positions.

7. A ready access information storage system for selectively positioning one of a plurality of information carriers at an access location including in combination, a support, a magazine for holding said carriers, means mounting said magazine on said support for rotary movement of said carriers past said access location, actuatable first stop means for selectively stopping said magazine at a plurality of angularly spaced first positions, actuatable second stop means for selectively stopping said magazine at a plurality of angularly spaced second positions intermediate said first positions, means for actuating said first stop means and means for concomitantly deactuating said first stop means and for actuating said second stop means.

8. A ready access information storage system for selectively positioning one of a plurality of information carriers at an access location including in combination, a support, a magazine for holding said carriers, means mounting said magazine for rotary movement of said carriers past said location, means comprising a slip clutch for driving said magazine, actuatable first stop means for selectively stopping said magazine against the action of said drive means at a plurality of first angularly spaced positions, actuatable second stop means for selectively stopping said magazine against the action of said drive means at a plurality of second angularly spaced positions intermediate said first positions, means for actuating said first stop means and means for concomitantly deactuating said first stop means and for actuating said second stop means.

9. A ready access information storage system for selectively positioning one of a plurality of information carriers at an access location including in combination, a support, a magazine for holding said carriers, means mounting said magazine on said support for rotary movement of said carriers past said access location, actuatable first stop means for selectively stopping said magazine at a plurality of angularly spaced first positions, actuatable second stop means for selectively stopping said magazine at a plurality of angularly spaced second positions intermediate said first positions, means for actuating said first stop means, means for concomitantly deactuating said first stop means and for actuating said second stop means, means for moving a carrier at said location in a radial direction, actuatable third stop means for positioning a carrier moving radially at one of a plurality of radially spaced locations and means for actuating said third stop means.

10. A ready access information storage system for selectively positioning one of a plurality of information carriers at an access location including in combination, a support, a magazine for holding said carriers, means mounting said magazine for rotary movement of said carriers past said location, means comprising a slip clutch for driving said magazine, actuatable first stop means for selectively stopping said magazine against the action of said drive means at a plurality of first angularly spaced positions, actuatable second stop means for selectively stopping said magazine against the action of said drive means at a plurality of second angularly spaced positions intermediate said first positions, means for actuating said first stop means, means for concomitantly deactuating said first stop means and for actuating said second stop means, an arm having means thereon for engaging a carrier positioned at said location, means for moving said arm in a radial direction, third actuatable stop means for selectively stopping said arm in one of a plurality of radially spaced positions and means for actuating said third stop means.

11. A system as in claim 10 in which said arm moving means comprises a solenoid.

References Cited by the Examiner

UNITED STATES PATENTS

| | | | |
|---|---|---|---|
| 926,939 | 7/1909 | Guerrant | 88—27 |
| 1,709,430 | 4/1929 | Hentzschel | 129—16.1 |
| 2,293,408 | 8/1942 | Schwanhausser | 88—27 |
| 2,880,003 | 3/1959 | Vanderzee | 88—28 |
| 2,902,329 | 9/1959 | Brink et al. | 274—41.4 |

EUGENE R. CAPOZIO, *Primary Examiner.*

W. GRIEB, *Assistant Examiner.*